(12) United States Patent
Åsemyr

(10) Patent No.: US 6,594,015 B1
(45) Date of Patent: Jul. 15, 2003

(54) METHOD AND A DEVICE FOR CALIBRATING EQUIPMENT FOR DETERMINING THE SURFACE UNIFORMITY OF FILM OR SHEET MATERIAL

(75) Inventor: Göran Åsemyr, Onsala (SE)

(73) Assignee: Semyre Photonic Systems AB, Stenungsund (SE)

( * ) Notice: Subject to any disclaimer, the term of this patent is extended or adjusted under 35 U.S.C. 154(b) by 0 days.

(21) Appl. No.: 09/958,710

(22) PCT Filed: Apr. 10, 2000

(86) PCT No.: PCT/SE00/00682
§ 371 (c)(1), (2), (4) Date: Oct. 12, 2001

(87) PCT Pub. No.: WO00/62014
PCT Pub. Date: Oct. 19, 2000

(30) Foreign Application Priority Data

Apr. 12, 1999 (SE) ................................................ 9901292

(51) Int. Cl.⁷ .......................... G01N 21/84; G01B 11/28
(52) U.S. Cl. ........................................ 356/429; 356/630
(58) Field of Search ................................. 356/429–431, 356/625, 630, 632, 237.1, 238.1, 238.2, 239.1, 237.2; 250/227.11, 227.14, 358.1, 571, 560, 561; 73/86, 116, 118.1

(56) References Cited

U.S. PATENT DOCUMENTS

| | | | |
|---|---|---|---|
| 4,656,663 A | * | 4/1987 | Jansson et al. ............. 382/141 |
| 4,810,894 A | * | 3/1989 | Nagao et al. ........... 250/559.27 |
| 5,047,652 A | * | 9/1991 | Lisnyansky et al. ... 250/559.01 |
| 5,850,287 A | * | 12/1998 | Sorin et al. ................. 356/503 |
| 6,080,982 A | * | 6/2000 | Cohen ................... 250/227.11 |

FOREIGN PATENT DOCUMENTS

DE 4416786 11/1995

* cited by examiner

Primary Examiner—Michael P. Stafira
(74) Attorney, Agent, or Firm—Nixon & Vanderhye

(57) ABSTRACT

Equipment for determining the surface uniformity of film or sheet material, in which the material is arranged to pass over a rotating measuring shaft, a light source being arranged to illuminate the horizon formed by the outer surface of the material exactly where it is in contact with the periphery of the measuring shaft, and also a light detector for detecting light transmitted from the light source and emitting corresponding electric signals to subsequent signal-processing apparatus in order to determine the dimensions, number and locations of the irregularities from the shadows produced by the surface irregularities. In a method for calibrating equipment of this type, at least one calibration shaft (10, 12) is produced with a diameter corresponding to the diameter of the measuring shaft and the thickness of the material being calibrated, after which a number of elevations (No.1, No.2, No.3) are produced on the peripheral surface of the shaft and the actual dimensions of the elevations are determined. The calibration shaft is thereafter rotated in said measuring position and the dimensions of the elevations are determined from transmitted light detected by the light detector. Dimensions thus determined are compared with the actual dimensions of the elevations in order to calibrate the equipment. A device for calibrating such equipment comprises a calibration unit arranged to rotate a calibration shaft provided with elevations of predetermined size on its peripheral surface, in said measuring position, in order to determine the dimensions of the elevations from the light transmission detected and compare them with the actual size of the elevations for calibration of the equipment.

8 Claims, 3 Drawing Sheets

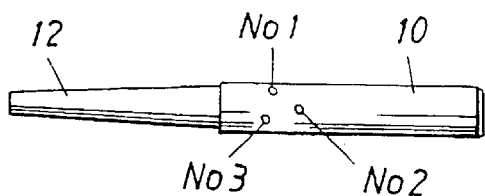
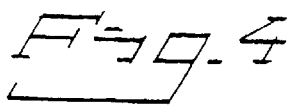
Elevation No. 1
Height        74 μm
Half width    316 μm
Base extension 454 μm
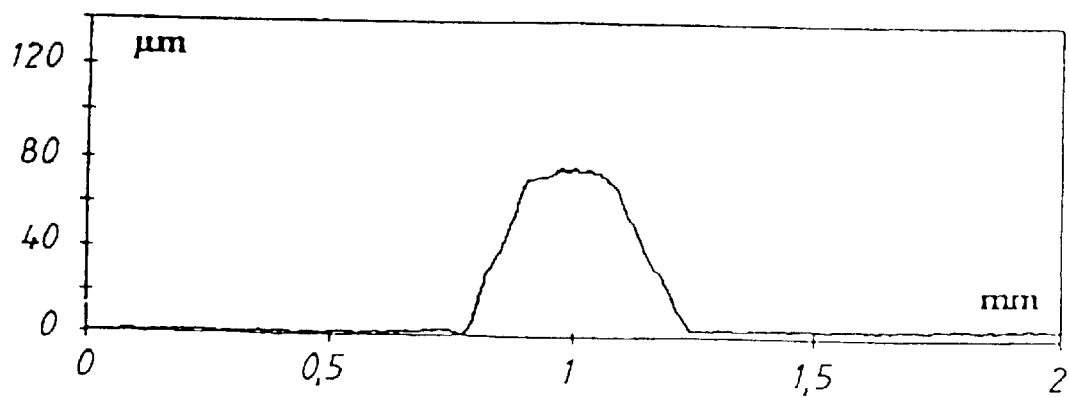

Elevation No. 2
Height 105 μm
Half width 473 μm
Base extension 655 μm
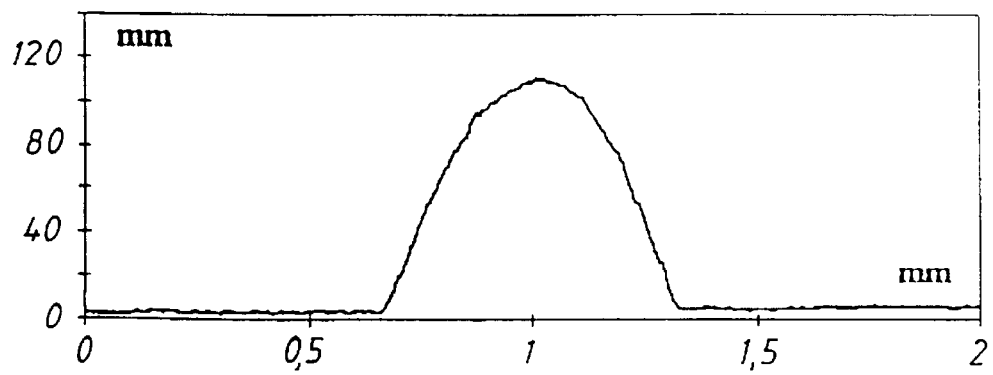
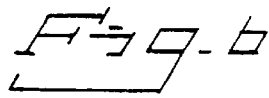
Elevation No. 3
Height 75 μm
Half width 304 μm
Base extension 425 μm
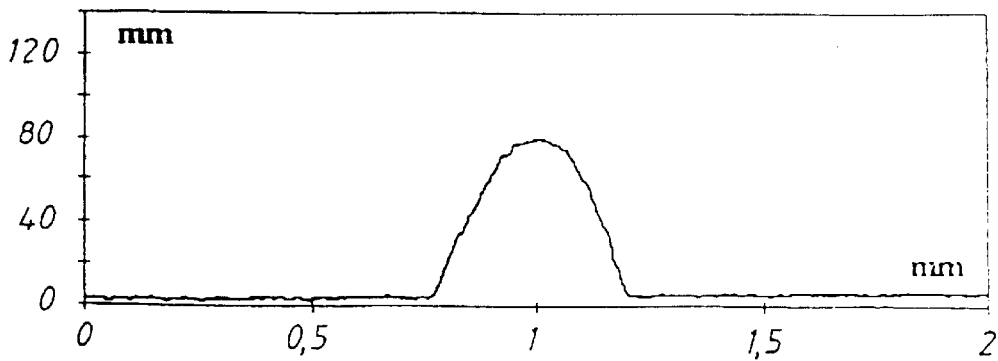

METHOD AND A DEVICE FOR CALIBRATING EQUIPMENT FOR DETERMINING THE SURFACE UNIFORMITY OF FILM OR SHEET MATERIAL

BACKGROUND OF THE INVENTION

The present invention relates to a method for calibrating equipment for determining the surface uniformity of film or sheet material, said equipment comprising a measuring position in which the material is arranged to pass over a rotating measuring shaft, a light source arranged to illuminate the horizon formed by the outer surface of the material exactly where it is in contact with the periphery of the measuring shaft, and a light detector for detecting light transmitted from the light source and emitting corresponding electric signals to subsequent signal-processing apparatus in order to determine the dimensions, number and locations of the irregularities from the shadows produced by the surface irregularities.

When an impurity appears in material such as polyethylene tape or film, it migrates for hydrodynamic reasons towards the surface of the tape or film and is deposited in the surface so that approximately half its diameter protrudes from the surface. Surface uniformity determination is therefore included when checking the quality of such tape or film.

U.S. Pat. No. 4,656,663 describes a system for inspecting transparent film, primarily intended for use as videotape, to detect irregularities in the surface of the film. A sample of the film is coated with metal by means of steaming on, the metal being applied at a certain angle. The film is then illuminated and the distribution of irregularities is determined with a scanning video camera from the number and length of the "shadows" obtained in the metallization, caused by irregularities in the surface of the film. The signal obtained at the scanning is digitalized, stored in a computer memory and processed pixel by pixel.

SUMMARY OF THE INVENTION

The present invention relates to equipment for determining the surface uniformity of film or sheet material which is caused to pass over a measuring shaft and the horizon formed by the outer surface of the material where it is in contact with the periphery of the measuring shaft is illuminated and the light transmitted is detected. The dimensions, number and locations of the irregularities are detected from the transmitted light detected, which is related to shadows produced by the surface irregularities. The object of the invention is more specifically to achieve a new, reliable method and provide a new, reliable device for calibrating this type of equipment for determining surface uniformity.

This object is achieved with a method and a device of the type described in the introduction, having the characteristics defined in claim 1 and claim 8, respectively.

A very substantial advantage with the calibration method and device according to the invention is that the calibration can be traced backwards, which is a requirement according to the ISO 9000 standard.

The equipment for determining surface uniformity is intended for use for film or sheet material, e.g. tape of various thicknesses, that is to say material extruded at various speeds to various thicknesses. According to an advantageous embodiment of the method according to the invention calibration shafts are produced having different diameters corresponding to different material thicknesses. The equipment is thus calibrated for different material thicknesses, using different calibration shafts.

According to another advantageous embodiment of the method according to the invention said elevations are produced on the calibration shafts by applying drops of glue on the peripheral surfaces of the shafts and causing them to harden. Before the glue, suitably epoxy plastic, hardens the drops spread out so that their shape substantially resembles a normal distribution curve. Hardening is suitably performed in heat.

According to yet another embodiment of the method according to the invention the actual dimensions of the elevations are determined with the aid of a reading microscope. The relative uncertainty of this determination is estimated to 1% from the spread in measured data and also estimated uncertainties in the equipment used.

According to another embodiment of the method according to the invention the calibration shafts are rotated several turns to enable determination of hit rate and standard deviations, as well as determining the height and width of the elevations.

According to yet another advantageous embodiment of the method according to the invention a spectrography camera is used as light detector, said camera emitting signals representing light transmission data scanned pixel by pixel.

According to a further advantageous embodiment of the method according to the invention, before measurement is commenced on the calibration shaft a scale is applied in the measuring position of the detecting equipment, with the aid of which the desired pixel resolution is adjusted and the camera focus fixed on the measuring position. The scale used is suitably a commercially available Heidenhain scale designed for such purposes. The camera is fixed mechanically following correct setting and thereafter maintains this correct setting.

To explain the invention further a number of examples of the device according to the invention will be described in more detail by way of example, with reference to the accompanying drawings in which

BRIEF DESCRIPTION OF THE DRAWINGS

FIG. 3 shows an example of a calibration shaft, and FIGS. 4–6 shows examples of elevations applied on the peripheral surface of the calibration shaft.

DETAILED DESCRIPTION OF THE PREFERRED EMBODIMENTS

Figure 1:
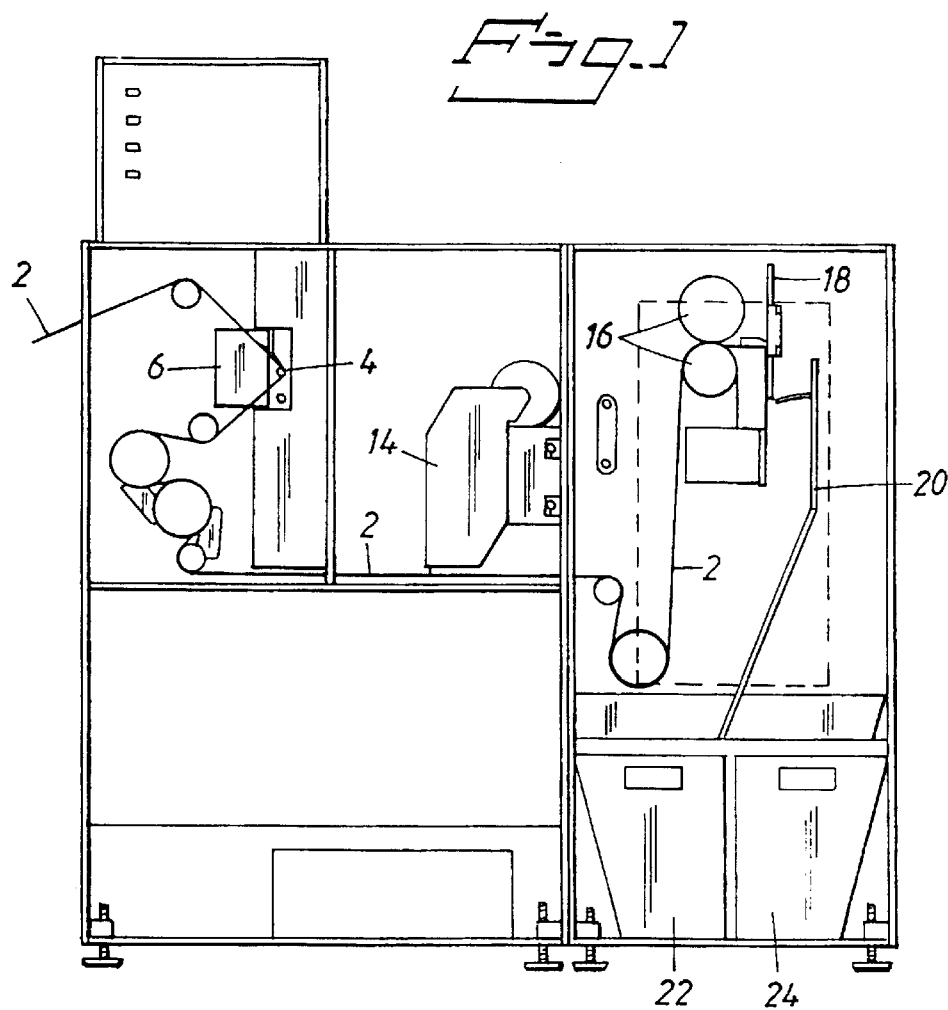
FIG. 1 illustrates schematically the type of equipment for determining surface irregularities, to which the invention relates.

FIG. 1 shows schematically an equipment for determining the surface uniformity of film or sheet material, such as tape extruded from black polyethylene, for instance. The material 2 runs through the equipment over a number of pulleys and drive rolls and at 4 a measuring shaft is shown in the actual measuring unit 6. Upon passage over the measuring shaft 4 the outer surface of the material 2 forms a horizon which is illuminated by a light source placed immediately below the shaft 4, for instance, (not shown in detail in the figure) in the measuring unit 6, and a light detector placed immediately above the shaft 4, for instance, is arranged to detect transmitted light. Irregularities in the outer surface of the material 2 will thus block the light to a varying extent, thereby influencing the amount of light transmitted. The light detector thus emits an electric signal representing transmitted light to subsequent signal-processing apparatus in order to determine the dimensions, number and locations of the surface irregularities.

Other parts of the equipment illustrated in FIG. 1 are not a part of the invention and will therefore be described more briefly.

The mid-section of the equipment thus comprises a label printer 14 to mark the tape 2 with a label where a surface irregularity is encountered.

In the section furthest to the right in FIG. 1 the tape 2 is cut into pieces of predetermined length immediately after it has passed between two rolls 16, by a rotating knife 18. Flawless lengths fall down to the left of the partition 20 into the container 22 for flawless material. When a label has been applied to the tape 2 to indicate a surface irregularity, as mentioned above, the knife 18 is temporarily stopped so that a longer piece of tape with the detected irregularities will be cut off. Since the cutting process is temporarily stopped the tape will protrude over the upper edge of the partition 20 and when the longer piece of tape has been cut it will fall down to the right of the partition 20 into the container 24 for rejected material.

Figure 2:
FIG. 2 shows the calibration unit in the arrangement according to the invention.
Figure 2:
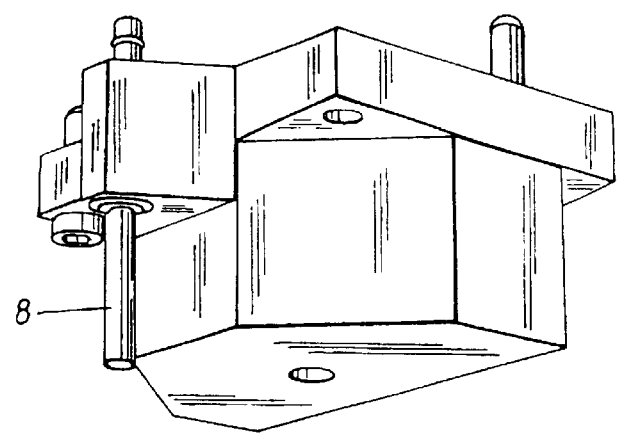

The calibration unit shown in FIG. 2 is used for calibrating the equipment shown in FIG. 1. A calibration shaft 8 of predetermined dimension and with elevations of predetermined dimensions and number applied on its peripheral surface can be mounted in the calibration unit for rotation. With this calibration unit the calibration shaft 8 is applied in the measuring position in which the measuring shaft 4 is normally located. Dimensions, sizes and locations of the elevations on the calibration shaft 8 are now determined in the manner described above, from transmitted light detected by the light detector.

The actual dimensions, number and locations of the elevations on the calibration shaft 8 are determined in a manner described in more detail in the following with reference to FIGS. 3–6 and the equipment is calibrated by comparison of the dimensions determined using the equipment, with the actual dimensions of the elevations.

Rotating the calibration shaft 8 several turns ensures that the elevations are repeated at each turn. This also enables determination of hit rate, that is to say the number of elevations encountered in relation to the actual number of elevations passed, and the standard deviation, as well as the heights and widths of the elevations. This hit rate is normally very close to 100%.

Before running the calibration shaft in the equipment, the desired pixel resolution is set with the aid of a "Heidenhain scale" and the focus of the light detector, preferably a spectrography camera, is set. The position of the detector is then fixed mechanically and this position need not subsequently be adjusted.

As mentioned, a spectrography camera is preferably used as light detector, this emitting signals representing scanned light transmission values pixel by pixel. A spectrography camera is particularly suitable since it has rectangular pixels of 13×500 $\mu$m. The pixels' height of 500 $\mu$m is then used to measure the height of the irregularities. An objective is arranged in front of the detector. This objective may be 26 mm long, in which case a width of 20 mm of the material or the calibration shaft is viewed, i.e. the objective projects 20 mm of the material or calibration shaft onto 26 mm of detector surface, thus reducing the height resolution from 500 $\mu$m to 400 $\mu$m. Irregularities thus appear in a poorer transmission. The irregularities will shadow more or less, which is thus detected in pixels that are projected on the material or calibration shaft with a width resolution of approximately 10 $\mu$m since the size is reduced from 26 mm to 20 mm.

FIG. 3 shows an example of a calibration shaft intended for application in the calibration unit shown in FIG. 2. The calibration shaft comprises a measurement part 10 and a conical shaft part 12 for mounting in the calibration unit. The calibration shaft is suitably made of steel and the measurement part 10 may typically be 70 mm long and have a diameter of 8 mm. The diameter of the calibration shaft is equal to the diameter of the measuring shaft plus the thickness of the material to which the calibration relates. Since the detecting equipment is intended for use with materials of different thicknesses, calibration shafts with different diameters are produced to enable calibration of the equipment for each thickness of material.

Three elevations No.1, No.2 and No.3 are applied on the peripheral surface of the measurement part 10 of the calibration shaft. These elevations suitably consist of drops of epoxy plastic that have been caused to harden. Data as to the dimensions of the drops or elevations can be found in FIGS. 4–6 illustrating the drops in section on a larger scale, and stating height, half-width and base extension.

The actual dimensions of the drops or elevations are determined by reading microscope and the measuring equipment can thus be calibrated by comparison of the dimensions determined using the equipment with these actual dimensions.

What is claimed is:

1. A method for calibrating equipment for determining the surface uniformity of film or sheet material, said equipment comprising a measuring position in which the material is arranged to pass over a rotating measuring shaft, a light source arranged to illuminate the horizon formed by the outer surface of the material exactly where it is in contact with the periphery of the measuring shaft, and a light detector for detecting light transmitted from the light source and emitting corresponding electric signals to subsequent signal-processing apparatus in order to determine the dimensions, number and locations of the irregularities from the shadows produced by the surface irregularities, characterized in that at least one calibration shaft is produced having a diameter corresponding to the diameter of the measuring shaft and the thickness of the material being calibrated, after which a number of elevations are produced on the peripheral surface of the shaft and the actual dimensions of the elevations determined, and in that the calibration shaft is thereafter rotated in said equipment with the calibration shaft in said measuring position and the dimensions of the elevations are determined from transmitted light detected by the light detector, and comparing dimensions thus determined with the actual dimensions of the elevations in order to calibrate the equipment.

2. A method as claimed in claim 1, characterized in that calibration shafts with different diameters are produced, corresponding to different material thicknesses.

3. A method as claimed in claim 1, characterized in that said elevations on the calibration shafts are produced by applying drops of glue on the peripheral surfaces of the shafts and caused to harden.

4. A method as claimed in claim 1, characterized in that the actual dimensions of the elevations are determined with the aid of a reading microscope.

5. A method as claimed in claim 1, characterized in that the calibration shafts are rotated several turns to enable determination of hit rate and standard deviations, as well as determining the height and width of the elevations.

6. A method as claimed in claim 1, characterized in that a spectrography camera is used as light detector, said camera emitting signals representing light transmission values scanned pixel by pixel.

7. A method as claimed in claim 6, characterized in that before measurement is commenced on the calibration shaft, a scale is applied in the measuring position of the detecting equipment, with the aid of which the desired pixel resolution is adjusted and the camera focus fixed on the measuring position.

8. A device for calibrating equipment for determining the surface uniformity of film or sheet material, said equipment comprising a measuring position in which the material is arranged to pass over a rotating measuring shaft, a light source arranged to illuminate the horizon formed by the outer surface of the material exactly where it is in contact with the periphery of the measuring shaft, and a light detector for detecting light transmitted from the light source and emitting corresponding electric signals to subsequent signal-processing apparatus in order to determine the dimensions, number and locations of the irregularities from the shadows produced by the surface irregularities, characterized in that a calibration unit is arranged to rotate a calibration shaft provided with elevations of predetermined size on its peripheral surface, in said measuring position, in order to determine the dimensions of the elevations from the light transmission detected and compare them with the actual size of the elevations for calibration of the equipment.

* * * * *